US012700011B1

(12) United States Patent (10) Patent No.: US 12,700,011 B1

Chawla (45) Date of Patent: Aug. 4, 2026

(54) RETARGETING TELECOMMUNICATION SERVICE PROVIDER WEBSITE USERS FOR CONTENT VIEWS USING MACHINE LEARNING SYSTEMS AND METHODS

(71) Applicant: T-Mobile USA, Inc., Bellevue, WA (US)

(72) Inventor: Hemant Chawla, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 197 days.

(21) Appl. No.: 17/225,860

(22) Filed: Apr. 8, 2021

(51) Int. Cl.
  *G06Q 30/0201*  (2023.01)
  *G06Q 30/0251*  (2023.01)
  *H04L 67/14*  (2022.01)

(52) U.S. Cl.
  CPC ..... *G06Q 30/0201* (2013.01); *G06Q 30/0255* (2013.01); *G06Q 30/0261* (2013.01); *H04L 67/14* (2013.01)

(58) Field of Classification Search
  None
  See application file for complete search history.

(56) References Cited

U.S. PATENT DOCUMENTS

| | | | |
|---|---|---|---|
| 8,200,661 B1 | 6/2012 | Pearce et al. |
| 9,641,575 B2 | 5/2017 | Le Huerou et al. |
| 9,762,597 B2 | 9/2017 | Doganata et al. |
| 10,079,932 B2 | 9/2018 | Rodriguez et al. |

| | | | |
|---|---|---|---|
| 10,097,546 B2 | 10/2018 | Hao et al. |
| 10,148,819 B2 | 12/2018 | Yokel et al. |
| 10,311,377 B2 | 6/2019 | Vijayaraghavan et al. |
| 10,440,180 B1 | 10/2019 | Jayapalan et al. |
| 10,455,438 B2 | 10/2019 | Bisada |
| 10,490,191 B1 | 11/2019 | Benkreira et al. |
| 11,966,953 B1 * | 4/2024 | Peshwe .............. G06Q 30/0282 |
| 2003/0108000 A1 | 6/2003 | Chaney et al. |
| 2004/0204063 A1 | 10/2004 | Van |

(Continued)

FOREIGN PATENT DOCUMENTS

| | | |
|---|---|---|
| EP | 1867136 | 12/2007 |
| EP | 1869841 | 12/2009 |

(Continued)

*Primary Examiner* — Mathew Syrowik

(74) *Attorney, Agent, or Firm* — Ashurst Perkins Coie US LLP

(57) ABSTRACT

Systems and methods for retargeting users of a telecommunication service provider's website. The retargeting system prioritizes users for retargeting by assessing likelihood that the user will convert to a customer based on session-level navigation flows, user historic session patterns, and consumer data. This information is used to create a training dataset that indicates whether the information is associated with converting or non-converting users. The training dataset is used to train a machine learning model to generate conversion scores indicating a likelihood that a user will convert to a customer and retargeting recommendations. The conversion scores and recommendations can be used prioritize users for retargeting via third-party services, such as websites, social media platforms, or messaging services. Using training data, accuracy of the machine learning model can be assessed. When accuracy of the machine learning model does not exceed a threshold accuracy, the system can be retrained.

20 Claims, 5 Drawing Sheets

| User ID (510) | Session ID (515) | Duration on Webpage (minutes) (520) | | | Page Sequence (525) | Date of Session (530) |
|---|---|---|---|---|---|---|
| | | Page A | Page B | Page C | | |
| 1234 | 1101 | 30 | 20 | 0 | A>B | 12/6/21 |
| 1235 | 1102 | 0 | 0 | 5 | C | 12/8/21 |
| 1236 | 1103 | 5 | 6 | 2 | A>B>C | 12/16/21 |
| 1237 | 1104 | 2 | 0 | 0 | A | 12/18/21 |
| 1235 | 1105 | 2 | 2 | 5 | A>B>C | 12/9/21 |
| 1237 | 1106 | 15 | 15 | 0 | B>A | 12/13/21 |

500

505

(56) References Cited

U.S. PATENT DOCUMENTS

| | | | |
|---|---|---|---|
| 2006/0098624 A1 | 5/2006 | Morgan et al. | |
| 2006/0101098 A1 | 5/2006 | Morgan et al. | |
| 2014/0189519 A1 | 7/2014 | Powell | |
| 2015/0066644 A1* | 3/2015 | Narasimhan | G06Q 30/0255 705/14.53 |
| 2015/0310336 A1* | 10/2015 | Sotela | G06N 20/20 706/46 |
| 2015/0324361 A1 | 11/2015 | Glass et al. | |
| 2016/0078485 A1* | 3/2016 | Shim | G06Q 30/0271 705/14.64 |
| 2016/0335405 A1 | 11/2016 | Perunov et al. | |
| 2017/0083626 A1 | 3/2017 | Kensel et al. | |
| 2017/0085962 A1* | 3/2017 | Maughan | H04N 21/25883 |
| 2017/0220692 A1 | 8/2017 | Greenwood et al. | |
| 2017/0221090 A1* | 8/2017 | Li | G06Q 30/0244 |
| 2018/0131810 A1 | 5/2018 | Yokel | |
| 2018/0218287 A1* | 8/2018 | Wang | G06Q 30/0201 |
| 2019/0014158 A1 | 1/2019 | Sylvain et al. | |
| 2019/0266622 A1* | 8/2019 | Turnbull | H04W 4/029 |
| 2020/0112557 A1 | 4/2020 | Mccullough et al. | |
| 2021/0150548 A1* | 5/2021 | Dua | G06F 18/2113 |
| 2021/0406931 A1* | 12/2021 | Liu | G06N 20/00 |

FOREIGN PATENT DOCUMENTS

| | | | |
|---|---|---|---|
| EP | 2942749 | 11/2015 | |
| EP | 3014539 | 5/2016 | |
| EP | 3278291 | 2/2018 | |
| JP | 2004533751 | 11/2004 | |
| KR | 20070047293 | 5/2007 | |
| WO | 9907108 | 4/1999 | |
| WO | 2006100475 | 9/2006 | |
| WO | 2006134313 | 2/2007 | |
| WO | 2013190334 | 3/2014 | |
| WO | 2013055939 | 5/2014 | |
| WO | 2014206660 | 12/2014 | |
| WO | 2016073935 | 5/2016 | |
| WO | 2016161078 | 10/2016 | |
| WO | 2018085696 | 7/2018 | |
| WO | 2019014258 | 1/2019 | |
| WO | 2019177481 | 9/2019 | |
| WO | WO-2021127778 A1 * | 7/2021 | G06F 11/3006 |

* cited by examiner

100

200

| Session Data Module 210 | Navigation Flow Module 220 | Session History Module 230 |
| Consumer Data Module 240 | Machine Learning Module 250 | Conversion Scoring Module 260 |

300

310
Receive session data for converting and non-converting users

320
Generate session flows

330
Generate user historic session patterns

340
Receive user consumer data

350
Create training dataset

360
Train ML model to generate conversion scores

| User ID | Session ID | Duration on Webpage (minutes) | | | Page Sequence | Date of Session |
|---------|------------|--------|--------|--------|----------|---------|
| | | Page A | Page B | Page C | | |
| 1234 | 1101 | 30 | 20 | 0 | A>B | 12/6/21 |
| 1235 | 1102 | 0 | 0 | 5 | C | 12/8/21 |
| 1236 | 1103 | 5 | 6 | 2 | A>B>C | 12/16/21 |
| 1237 | 1104 | 2 | 0 | 0 | A | 12/18/21 |
| 1235 | 1105 | 2 | 2 | 5 | A>B>C | 12/9/21 |
| 1237 | 1106 | 15 | 15 | 0 | B>A | 12/13/21 |

RETARGETING TELECOMMUNICATION SERVICE PROVIDER WEBSITE USERS FOR CONTENT VIEWS USING MACHINE LEARNING SYSTEMS AND METHODS

BACKGROUND

Businesses, such as telecommunication service providers, expend significant time and money targeting users with content to encourage the targeted users to buy products and services. This content can be provided through social media, third-party websites, email or other messaging services, and so forth. Targeting users can include identifying users or user characteristics and selecting communication channels and content types to target these users, which can require significant amounts of employee time, computing resources, and funds to deliver content.

BRIEF DESCRIPTION OF THE DRAWINGS

Detailed descriptions of implementations of the present invention will be described and explained through the use of the accompanying drawings.

Figure 1:
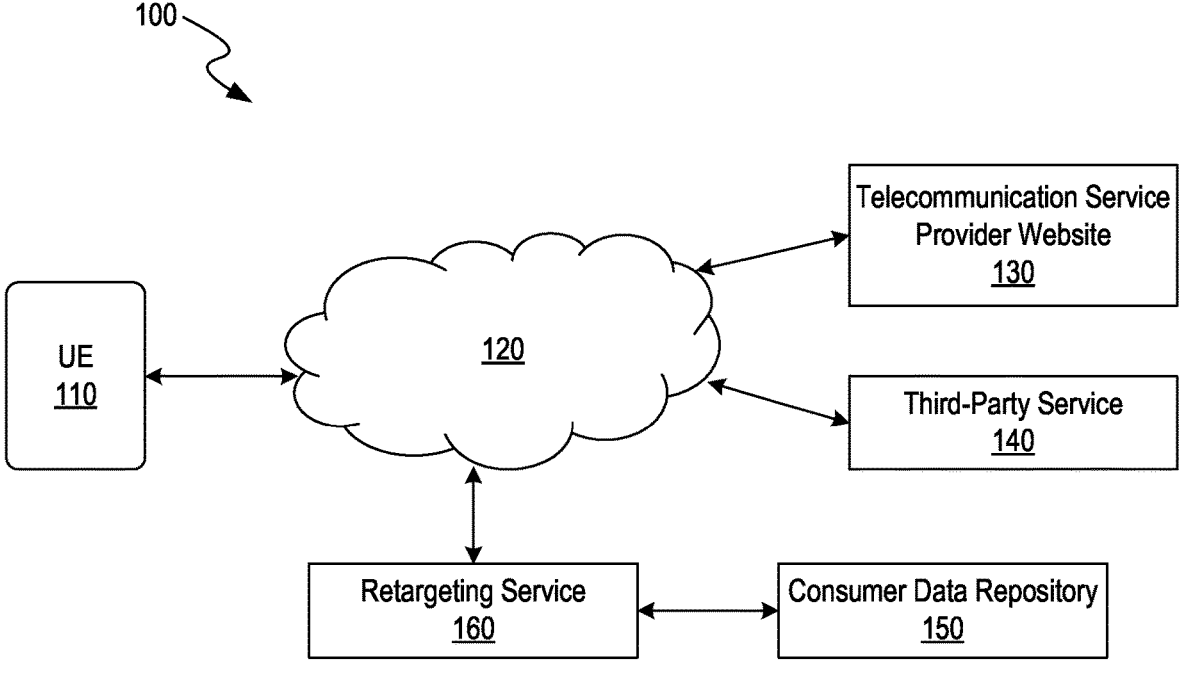
FIG. 1 is a block diagram illustrating a suitable computing environment within which a system for retargeting telecommunication service provider website users for content views using machine learning operates.

In the drawings, some components and/or operations can be separated into different blocks or combined into a single block for discussion of some of the implementations of the present technology. The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications. Thus, the technology is not limited to the specific implementations described. On the contrary, the technology is intended to cover all modifications, equivalents, and alternatives falling within the scope of the technology as defined by the appended claims.

DETAILED DESCRIPTION

Businesses, such as telecommunication service providers, use retargeting to target users of their websites for content views based on their previous internet actions. Retargeting can tag online users by including a pixel within the target webpage or email, which sets a cookie in the user's browser. Once the cookie is set, a retargeting service can display content associated with the business to that user elsewhere on the internet, such as third-party websites or social media platforms, via an exchange. A business may retarget a user, for example, if the user is a non-customer of the business and the business wishes to display content associated with the business to the user with the intent of converting the user to a customer.

But existing retargeting technologies are inefficient and imprecise. For example, existing systems are not sufficiently targeted and only allow consideration of limited data when deciding whether to retarget a particular user for content views. These shortcomings can result in inefficient use of computing resources and business funds because a business may needlessly retarget many users that are not likely to convert to customers. These inefficiencies can be, for example, improper use of storage, communication, or computing resources. For example, 37% of marketers report that resources are wasted as a result of inadequate data, and 35% of marketers indicate that inadequate data causes inaccurate targeting. As a result, an estimated 21% of media resources spent on delivering paid content is wasted due to poor data quality. These resources can include, for example, computing and network resources of the business. Accurately identifying users for retargeting poses a difficult technical challenge because, in general, the number of website sessions associated with converting users can be very small (e.g., ~0.1-0.5%) as a percentage of overall website sessions. In addition, imprecise retargeting can lead to user dissatisfaction because users are retargeted with content that is not relevant to them or for products or services that they are unlikely to buy. Excessive or imprecise retargeting can cause users to feel negatively about a business, and, thus, can negatively impact a business's ability to convert customers or subsequently engage users for content that is relevant to them.

Thus, there is a need for a solution that overcomes the foregoing technical problems and provides other benefits. For example, there is a need for a technical solution to identify the small percentage of website users who are likely to convert so that those users can be retargeted, thereby improving the quality of retargeting data and conserving resources (e.g., business resources, computing resources, etc.).

The disclosed technology makes it possible for a telecommunications service provider to more precisely retarget users of its website by identifying non-customer users who are likely to convert to customers. And the disclosed technology saves computing resources and funds of a telecommunications service provider by allowing the service provider to more efficiently and effectively allocate retargeting resources. For example, using the disclosed technology, resources dedicated to retargeting can be allocated more effectively because users who are likely to convert can be identified for retargeting with greater accuracy (e.g., ~89% accuracy), and users who are unlikely to be converted can be correctly deprioritized with ~68% accuracy. In addition, the disclosed technology can be used to A/B Test retargeting strategies, such as by testing various retargeting strategies on users who are identified as likely to convert and assessing predicted or actual conversion rates, or retargeting users who are identified as less likely to convert to see if there are ways of engaging these users that may change their minds.

Telecommunication service providers gather various data about users of their websites. Users can be identified using unique identifiers and their session activity on the website can be tracked. Although current systems allow service providers to retarget these users based on information gathered through tracking, existing systems have only limited options for identifying audiences for retargeted content. For example, existing systems do not fully leverage the wealth of website data (e.g., data regarding a user's behaviors during individual website sessions and across multiple sessions) collected by service providers. Nor do they combine this feature-enhanced website data with consumer data (e.g., statistical information about a user's location and household-level data about demographics, income, employment, etc.) about users to identify users who are likely to convert to customers so that the identified user can then be prioritized for retargeting. For example, without the disclosed system, telecom service providers will need to expend additional resources to process and serve content to several hundred users (if not more) who are unlikely to convert to customers. This adds additional network and processing load and otherwise wastes computing resources because these resources are allocated inefficiently to users that are unlikely to convert.

To solve these and other problems, disclosed herein is a system and related method for retargeting users of a telecommunication service provider website for content views using machine learning ("retargeting system"). For example, using the retargeting system, a telecommunication service provider can identify that a user of its website is a customer of another service provider and that the user is potentially interested in switching service providers, e.g., because the user accesses webpages associated with switching service providers. The retargeting system can analyze data about one or more sessions during which the user accesses the provider's webpages, based on characteristics of individual sessions and/or user behaviors across multiple sessions. In addition, the retargeting system can analyze consumer data associated with the user and/or a location associated with the user. Based on the analyzed session data and consumer data, the retargeting system can prioritize or deprioritize the user for retargeting. Retargeting can include delivering to the user content associated with the provider and intended to encourage the user to purchase goods or services of the service provider. Retargeting can be distinguished from other methods of delivering content (e.g., targeting) in that retargeting is typically based on previous interactions, such as attempting to reengage a user who has accessed a website, interacted with content, expressed an interest in a product or service, and so forth. In the above example, the retargeting system can prioritize the user for delivery of content associated with switching service providers, and the user can then receive content (e.g., messages or advertisements on social media or third-party websites) regarding switching service providers. One of the purposes of the retargeting system is to prioritize users for retargeting based on a likelihood that the user will convert to a customer of the telecommunication service provider. The disclosed technology includes training a machine learning model to generate a conversion score that indicates whether a particular website user is likely to become a customer of the telecommunication service provider. Conversion scores, in turn, can be used to prioritize users for retargeting that are particularly likely to become customers.

The machine learning model is trained using a training dataset that includes one or more of the following example data sets: (1) session flows that characterize individual sessions during which user(s) accessed webpages within a telecommunication service provider's website, (2) historic session patterns associated with users, which can characterize a user's browsing patterns on the telecommunication service provider's website across multiple sessions or longer time periods, and (3) consumer data associated with users, which can include personal information, statistical information, and current telecommunication service provider information. The training dataset includes information about whether particular session flows, historic session patterns, and consumer data are associated with converting or non-converting users. Using the training dataset, the machine learning model is trained to determine whether a particular user's session flows, historic session patterns, and consumer data indicate a likelihood that the user will convert to a customer, and to express this likelihood as a numerical conversion score. The retargeting system can also generate a recommendation, which can include a recommendation that a user should be retargeted if the conversion score exceeds a threshold level, and a recommendation regarding communication channels and/or recommended content that should be used to retarget the user. Based on the conversion score and recommendation, the telecommunication service provider can decide whether to prioritize the user for retargeting by causing content to be displayed to the user via one or more third-party services (e.g., on a third-party website, on a social media platform, via email, etc.).

In the following description, for the purposes of explanation, numerous specific details are set forth in order to provide a thorough understanding of implementations of the present technology. The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The phrases "in some implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram illustrating a suitable computing environment 100 within which a system for retargeting telecommunication service provider website users for content views using machine learning operates. The environment 100 depicts communication channels via which a user can interact with a telecommunication service provider's website 130 and receive retargeted content for viewing via third-party services 140 (e.g., third-party websites, social media platforms, email services, etc.). The retargeted content can be provided via a retargeting service 160, which operates the retargeting system.

One or more user devices 110 access webpages, receive and transmit data, stream content, and/or perform other communications over a network 120. The user devices 110 can be mobile devices or user equipment (UE) associated with users, such as smartphones or other mobile phones, tablet computers, laptop computers, desktop computers, wearable devices, and so on. The network 120 can be a wired or wireless, public or private, network including, for example, the internet. Although not shown in the environment 100, the user devices 110 can access the network 120 via a telecommunications network and/or portions of the depicted network 120 can be provided by a telecommunications network, which can be accessed via one or more base stations (not shown). Users can use the user devices 110, for example, to access the telecommunication service provider's website 130, which provides webpages describing products and services offered by the telecommunications service provider.

Users can also utilize user devices 110 to access one or more third-party services 140 via the network 120. Third-party services 140 can be, for example, third-party websites, email or other messaging services, or social media platforms, such as Facebook®, Twitter®, Instagram®, and so forth. The third-party services 140 can deliver content to the user devices 110 via the network 120, which can include paid content such as advertisements and/or other promotional content (e.g., emails, messages, etc.). This paid content can be placed by a retargeting service 160, which retargets users for delivery of content associated with goods or services, such as products or services offered by the telecommunications service provider. Although the retargeting service 160 is depicted as a separate service, in some implementations it can be provided by the telecommunications service provider or a third-party service 140. To retarget users based on certain defined audiences (e.g., according to demographic or personal data) the retargeting service 160 receives consumer data from the consumer data repository 150 and data from the telecommunications service provider website 130 about users and sessions. The consumer data can be provided, for example, via a third-party service 140, or from proprietary or publicly available consumer data sources. Consumer data can include data gathered/received/purchased from social media websites, such as profile information (e.g., age, employment information, relationship information, educational information, user interests or activities, political affiliation, familial or household information, etc.). Consumer data can also include data gathered through market research, such as information provided in response to surveys. In addition, consumer data can include information gathered from publicly available sources, such as governmental reports or public records (e.g., census data).

In an example use case, a user associated with one of the user devices 110 accesses the telecommunication service provider's website 130 and views webpages associated with specific products or services offered, but the user does not purchase any products or services. The service provider can track the user's webpage access based on an identifier assigned to the user, and transmit the identifier and session data to the retargeting service 160. In some implementations, user tracking can be achieved, for example, using software provided by Adobe®, Inc. of San Jose, California, such as Adobe® Audience Manager or Adobe® People Core Service. The retargeting service receives the user identifier and session data and identifies consumer data associated with the user in the consumer data repository 150. Using the retargeting system, the retargeting service 160 assesses the likelihood that the user will convert to a customer of the telecommunication service provider and generates a conversion score based on a trained machine learning model. If the conversion score exceeds a threshold score then the user is prioritized for retargeting, and the retargeting service 160 delivers content associated with the telecommunications service provider to the user device 110 or another communication channel associated with the user via a third-party service 140, such as by placing an advertisement via Facebook, sending an email or other message to an account associated with the user, displaying content to the user via a streaming service, and so forth.

FIG. 1 and the discussion herein provide a brief, general description of a suitable computing environment 100 in which the retargeting system can be supported and implemented. Although not required, aspects of the retargeting system are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IOT) devices, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, one or more of the user devices 110 and/or cell sites associated with a telecommunication network (not shown) accessed by the user devices 110 can include network communication components that enable the devices to communicate with remote servers or other portable electronic devices by transmitting and receiving wireless signals using a licensed, semi-licensed, or unlicensed spectrum over a communications network, such as network 120. In some cases, the network 120 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network (not shown) can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Retargeting System

Figure 2:
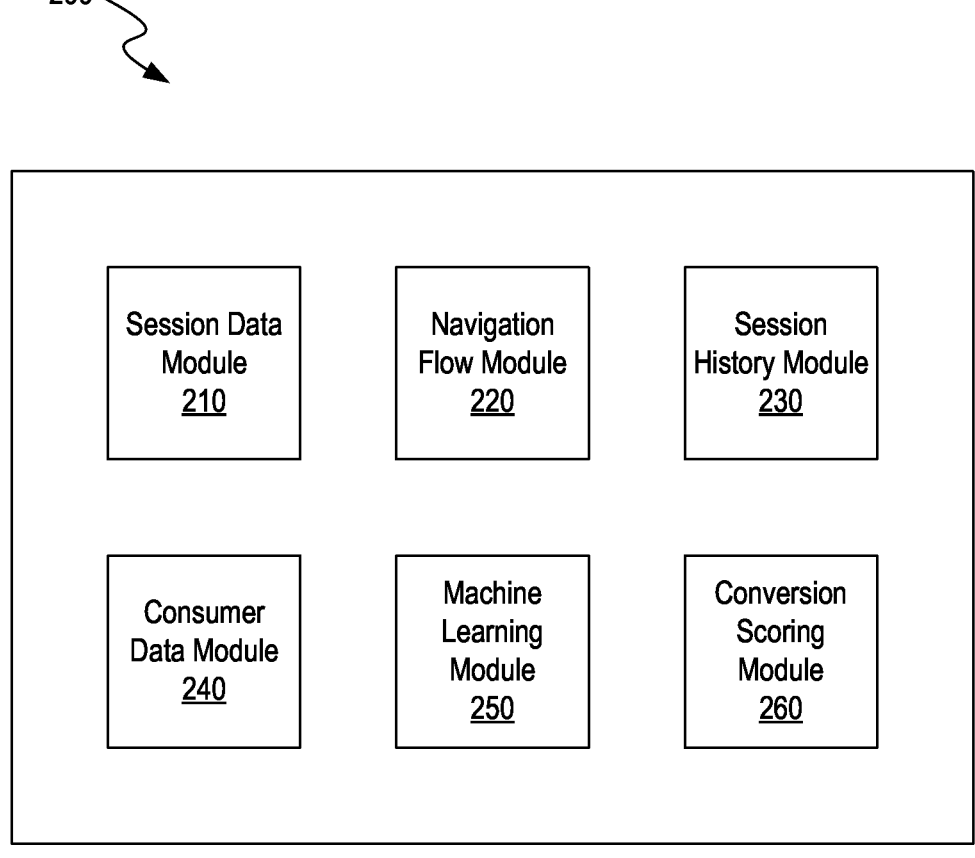
FIG. 2 is a block diagram illustrating components of a system for retargeting telecommunication service provider website users for content views using machine learning.

FIG. 2 is a block diagram illustrating components of a retargeting system 200 using machine learning to retarget telecommunication service provider website users. The retargeting system 200 can be associated with the retargeting service 160. The retargeting system 200 can include functional modules that are implemented with a combination of software (e.g., executable instructions or computer code) and hardware (e.g., one or more memories and one or more processors). Accordingly, as used herein, in some examples a module is a processor-implemented module or set of code, and represents a computing device having a processor that is at least temporarily configured and/or programmed by executable instructions stored in memory to perform one or more of the functions described herein. For example, the retargeting system 200 can include a session data module 210, a navigation flow module 220, a session history module 230, a consumer data module 240, a machine learning module 250, and a conversion scoring module 260, each of which is discussed separately below.

Session Data Module

The session data module 210 is configured and/or programmed to receive/access/process data associated with sessions during which users access webpages within a set of websites of a telecommunication service provider. A session can be a group of user interactions with a website that take place within a specified time frame (e.g., 30 minutes 60 minutes, 24 hours, etc.). Additionally or alternatively, a session can be a group of user interactions initiated by a user accessing at least one webpage within the set of webpages, and terminated by the user, for example, when the user navigates away from the set of websites of the telecommunication service provider (e.g., closes a web browser, becomes inactive, and/or navigates to a different website). For a given session, for example, the session data module 210 assigns a session identifier and stores a user identifier (e.g., an Adobe Experience Cloud Identifier (ECID), browser identifier, telephone number, device identifier, subscriber identity module (SIM), international mobile subscriber identity (IMSI), and so on) associated with the user who is accessing the website. The session data module 210 can also store information about specific webpages within the website that are accessed during a session and other session information, such as a Uniform Resource Location (URL) or other identifier for each webpage accessed, an amount of time spent on each webpage, a start and end time at which a webpage is accessed, a category for each webpage, a date or timestamp for the session, user's scrolling pattern for each webpage, user's location, actions taken on webpage. Information stored by the session data module 210 can indicate, for example, that a user saved items to a cart, visited a webpage showing directions to a store location, clicked an icon to initiate a phone call to a phone number associated with the telecommunications service provider, submitted a credit application, initiated a chat feature with an agent or bot, and so forth.

Webpages can be categorized based on their content, such as: network and coverage webpages (e.g., relating to geographic locations where a service provider offers coverage), service provider switching webpages (e.g., relating to services and incentives offered to customers who switch to the service provider from a different service provider), postpaid service webpages (e.g., relating to services and incentives offered to customers who select postpaid service plans), prepaid service webpages (e.g., relating to services and incentives offered to customers who select prepaid service plans), special plans webpages (e.g., relating to discounted or special plans offered based on military affiliation, for senior citizens, or for first responders), new phone webpages (e.g., describing mobile devices available for purchase from the service provider), "bring your own phone" webpages (e.g., describing services available to customers who want to subscribe to the service provider using a phone that they already own), "review cart" webpages (e.g., displayed to users who place items in a virtual shopping cart), checkout webpages (e.g. displayed to customers who begin the process of purchasing items in a virtual shopping cart), and confirm webpages (e.g., displayed to users who submit a purchase to a website but do not confirm payment).

Navigation Flow Module

The navigation flow module 220 is configured and/or programmed to use session data from the session data module 210 to generate session flows, which characterize user activity during individual sessions. Session flows include, for example, a user identifier, a time stamp for the session, information about an order in which webpages are accessed, an amount of time spent on the website and on each webpage, and category information about webpages accessed. A session flow, for example, can characterize an individual thirty-minute session in which a particular user accessed a webpage categorized as a new phone webpage, followed by a "review cart" webpage, followed by a checkout webpage, including an identifier for the user and the session, an order in which the webpages were accessed, and an amount of time spent on each page. But the session flow would not indicate, for example, whether that same user was associated with previous sessions because session flows only characterize individual sessions, and not user activities across multiple sessions.

Session History Module

The session history module 230 is configured and/or programmed to use data from the session data module 210 to generate user historic session patterns. In contrast to session flows, which are specific to individual sessions on a website, historic session patterns characterize user session activity across multiple sessions and/or greater time periods, such as a day, a week, two weeks, a month, etc. A historic session pattern can include information about a frequency of sessions, session duration information (e.g., average duration of a user's sessions, total time spent on a website in a given time period, longest or shortest session), a count of sessions for a visitor, and so forth. For example, a historic session pattern can show that a particular user has accessed the telecommunication service provider website four times in the last month and two times in the last week, but has not accessed the website in the last week. The historic session pattern can also show, for example, that the user spent an average of 15 minutes per session on the website.

Consumer Data Module

The consumer data module 240 is configured and/or programmed to receive/store/process consumer data associated with users who access the telecommunication service provider's website. Consumer data can include, without limitation, demographic or personal information about particular users, such as age, race, ethnicity, national origin, number of dependents, age of dependents, household income, user income, home ownership information, employment information, and so forth. Consumer data can further include information about a location associated with the user, such as a ZIP code or other postal code or location identifier, and statistical information associated with the location, such as income levels, property values, home ownership information, racial or ethnic demographics, familial demographics (e.g., average household size), and so forth. In addition, consumer data can include information about a user's current telecommunication services, such as information about a device associated with the user (e.g., mobile device make and model), data usage associated with the user, network coverage of the telecommunication service provider, average monthly bill for the telecommunication service provider, number of calls dropped by the telecommunication service provider in a given time period, presence of service provider equipment near locations associated with users, and so forth. Consumer data can indicate, for example, whether a consumer's mobile device is "locked" to a particular telecommunications service provider, whether the mobile device is associated with a current loan or lease, how frequently the consumer changes mobile devices, whether a mobile device was purchased new or used, a measured or estimated speed of internet communication to/from the mobile device, and so forth. Other examples of consumer data include information about services purchased by the consumer, such as television or internet services, and a price for those services. The consumer data module 240 can compile consumer data associated with particular users and generate consumer data profiles characterizing each user. The foregoing examples of consumer data are non-limiting, and consumer data can include any data characterizing users represented in session data.

Machine Learning Module

The machine learning module 250 is configured and/or programmed to generate or receive a training dataset that includes one or more of the following data sets: (1) session flows generated by the navigation flow module 220, (2) historic session patterns generated by the session history module 230, and/or (3) consumer data provided by the consumer data module 240. The machine learning module 250 uses the training dataset to train one or more machine learning models. Each received session flow, historic session pattern, and piece of consumer data includes an indication as to whether it is associated with either a converting user or a non-converting user. A converting user is a user who was a non-customer of the telecommunication service provider at the time the data was generated (e.g., at the time of a website session used to generate a session flow for the user) but who subsequently became a customer of the telecommunication service provider at some time before the machine learning module is trained. A non-converting user is a user of the telecommunication service provider's website who does not subsequently purchase any products or services of the telecommunication service provider. The machine learning module 250 trains the one or more machine learning models using the training dataset to assess, based on session flows, historic session patterns, and consumer data associated with a particular user, whether that user is likely to convert to a customer of the telecommunication service provider. This likelihood can be expressed, for example, as a conversion score. The one or more machine learning models can include at least one of Gradient Boosted Trees, Random Forest, XG Boost, Neural Network, or Logistic Regression models.

A conversion score can be, for example, a scaled numerical score, such as a score between 0 and 100, wherein a lower score indicates a lower likelihood of conversion and a higher score indicates a higher likelihood of conversion. In this example implementation, a user can be retargeted based on a threshold conversion score (e.g., users with a conversion score above 50, 60, 70, 80, etc. are retargeted). Additionally or alternatively, a conversion score can be a binary score of 0 or 1, where a score of 0 indicates that a user is not likely to convert and a score of 1 indicates that a user is likely to convert. In these and other implementations, the conversion score can be determined based on a threshold probability. For example, a user can be assigned a conversion score of 1 when the one or more machine learning models predict beyond a threshold probability (e.g., 50%, 60%, 70%, 80%, etc.) that the user is likely to convert. Conversion scores can be based on a set of weights and/or values assigned to session flows, historic session patterns, and/or consumer data determined by the one or more machine learning models based on a determination of the extent to which each feature predicts user conversion or non-conversion.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the one or more machine learning models trained by the machine learning module 250 can include a neural network with multiple input nodes that receive session data, consumer data, session flows, and/or historic session patterns. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to generate conversion scores and/or recommendations. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A machine learning model can be trained with supervised learning, where the training data includes session flows, historic session patterns, and/or consumer data as input and a desired output, such as a conversion score and/or a recommendation. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new session data and/or consumer data associated with users.

Conversion Scoring Module

The conversion scoring module 260 is configured and/or programmed to apply the one or more machine learning models trained by the machine learning module 250 by receiving data associated with a particular user, including a session flow, a historic session pattern, and/or a set of consumer data (e.g., a consumer profile characterizing the user), to generate a conversion score for that user. In some implementations, the conversion scoring module 260 can further generate a recommendation, such as a narrative statement or character string indicating whether, based on the conversion score, the user should be retargeted for content views associated with the telecommunication service provider. For example, a recommendation can be based on a conversion score threshold. When a conversion score for a user exceeds a threshold, the conversion scoring module 260 generates a recommendation indicating that the user should be retargeted because the user is likely to convert to a customer. In some implementations, the conversion scoring module 260 can further generate a recommendation about a retargeting channel or recommended content for retargeting the user. For example, the conversion scoring module 260 can generate a recommendation that a user should be retargeted via a particular social media platform (e.g., Facebook, Twitter, Instagram, etc.), via a certain device (e.g., on a mobile device, laptop, tablet, or connected device), during a certain time period (e.g., a particular day of the week, time of the day, time of the month or year, etc.), with certain kinds of content (e.g., content associated with a particular product or service offered by the telecommunication service provider), or via a certain communication channel (e.g., online advertisement, email or other message, social media, etc.).

In some implementations, training datasets used to train the one or more machine learning models that are applied by the conversion scoring module can include information about the conversion of a user to a customer, such as content displayed to the user before the user converted, a communication channel via which content was delivered, and timing information about the conversion (e.g., time of day, day of the week, etc.).

The conversion scoring module 260 can include an interface, such as a graphical user interface (GUI) or application programming interface (API) that provides the retargeting service by receiving inputs (e.g., sets of user identifiers and/or associated session flows, historic session patterns, and user data) and generates conversion scores and recommendations that can be used to decide whether and how to retarget specific users represented in the received inputs.

Training of Machine Learning Model

Figure 3:
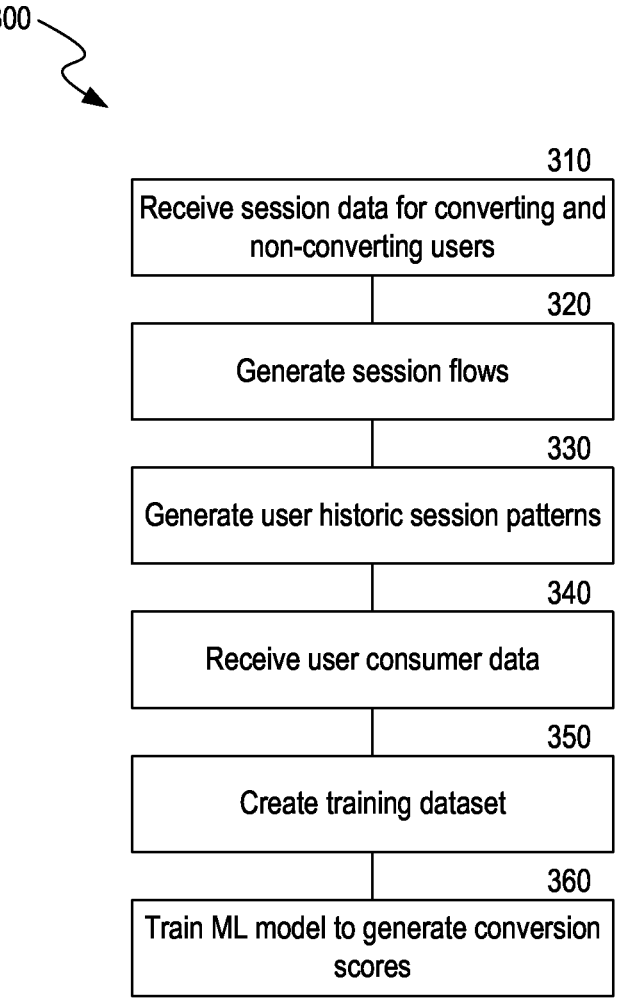
FIG. 3 is a flow diagram illustrating an example process for training a machine learning model to generate conversion scores for users of a website of a telecommunications service provider.

FIG. 3 is a flow diagram illustrating a process 300 for training a machine learning model to generate conversion scores for users of a website of a telecommunications service provider. The process 300 or portions thereof can be performed, for example, by the machine learning module 250.

The process 300 begins at block 310, where session data is received for multiple sessions during which users access webpages within one or more websites associated with a telecommunications service provider. In some implementations, the session data is limited to data regarding only sessions associated with non-customer users of the website (s). For example, session data can be associated with existing customers based on user information or device information, or based on a user being logged in to the one or more websites, and the customer session data can be discarded from the session data. The customer session data can also be analyzed separately for different kinds of retargeting, such as for delivering content to the customers for services that the customer has not purchased from the telecommunications service provider. For each session, the session data can include one or more time stamps, a user identifier, a set of webpages accessed during the session (e.g., identified by URL), and/or an indication of whether the user identifier is associated with a converting or non-converting user. Session data can be received, for example, periodically (e.g., every minute, every hour, every two hours, every 24 hours, etc.) in the form of one or more comma-separated values (CSV) files, such as via a feed from Adobe Analytics or similar. Session data can be received by the retargeting system or accessed by the retargeting system, such as via cloud storage provided by Amazon Web Services or a similar service.

Process 300 then proceeds to block 320, where the received session data is used to generate session flows for each session. Each session flow can include a user identifier, an order in which webpages are accessed, a duration for the session, a duration on each webpage during the session, and an indication of whether the user identifier is associated with a converting or non-converting user.

Process 300 then proceeds to block 320, where the received session data is used to generate historic session patterns associated with each user represented in the receives session data. Historic session patterns can characterize user session activity across multiple sessions, including information about frequency, total session duration on a website, date of first session, date of last session, and so forth. In an example implementation, each session is assigned a session identifier and associated with a user identifier, and each session is analyzed in relation to other sessions to determine counts for total sessions associated with the user within a certain time frame and/or total visits to individual webpages during various timeframes (e.g., in the last 1 day, 7 days, 21 days, etc.).

Process 300 then proceeds to block 340, where consumer data is received for each user represented in the session data. As described above, this consumer data can include data characterizing the user (e.g., demographics, income information, household information), data associated with a location of the user (e.g., ZIP code, statistical information, etc.), and/or data associated with a user's current telecommunication services (e.g., mobile device information, service plan information, coverage information, price information, etc.), which can be compiled into a consumer profile. In an example implementation, the session data received at block 310 includes, for each session, a ZIP code and/or a current telecommunications service provider associated with the user, and these are used to identify consumer data associated with the user. Additionally or alternatively, the session data can identify the user (e.g., based on device information or a user identifier), and the identity of the user can be used to identify consumer data about the specific user.

Process 300 then proceeds to block 350, where a training dataset is created using the generated session flows, historic session patterns, and consumer data. For example, each session flow, historic session pattern, and consumer profile can be associated with a user identifier and mapped to an indication of whether the user converted, which can be expressed numerically as a 0 for a non-converting user and a 1 for a converting user.

Process 300 then proceeds to block 360, where the machine learning model is trained to assess the likelihood that a user will convert to a customer based on session flows, historic session patterns, and consumer data. This likelihood can be expressed as a conversion score and/or a recommendation. As described elsewhere herein, a conversion score can be a scaled numerical score (e.g., between 0 and 100) or a binary score determined based on a threshold probability that the user is likely or unlikely to convert. The model can be, for example, one or more of a Gradient-Boosted Tree Ensemble, a Neural Network, a Logistic Regression, a Random Forest, or an XG Boost model.

In some implementations, the process 300 can further include testing the machine learning model. For example, a portion of the received session data and consumer data (e.g., 10%) can be excluded from the training dataset and used as test data to assess the accuracy of the trained model. The trained machine learning model is applied to the test data to determine whether the model correctly assesses the likelihood that users represented in the test data are converting or non-converting users with an accuracy beyond a threshold level (e.g., 70% accurate, 80% accurate, 90% accurate, etc.). If the trained machine learning model does not exceed the threshold accuracy when applied to the test data then the model can be retrained or discarded in favor of a more accurate model. Additionally or alternatively, the process 300 can include evaluating the model based on ongoing results. For example, conversion scores and/or recommendations generated by the model can be subsequently reviewed (e.g., weeks or months after they are generated) to determine whether the model accurately predicted conversion or non-conversion, and, based on this review, the model can be adjusted or retrained.

In some implementations, the machine learning model can be reevaluated periodically (e.g., monthly, quarterly, semi-annually, etc.) to assess accuracy and adjust or retrain the model as necessary. This reevaluation can identify and correct for model drift, such as by taking into account newly identified user behaviors, new webpages or other website features, or other changes.

In some implementations, the process 300 can include training multiple machine learning models and selecting from among the multiple models based on the accuracy of each model. For example, Gradient Boosted Trees, Random Forest, and XGBoost models can each be trained according to process 300, and the accuracy of each model can be assessed using test data. Based on the accuracy of each model, one or more of the trained models can be selected to then be applied by the retargeting system.

In some implementations, the training dataset can be resampled/balanced before being used to train the machine learning model. Resampling can improve the accuracy of a machine learning model, for example, when a training dataset includes an imbalance between different categories of data. For example, session data received at block 310 may include only a very small number of sessions associated with users who later convert to customers (e.g., 0.1%, 0.5%, 1%, 2%). To correct this imbalance, session data associated with these converting users can be resampled (e.g., by duplicating) such that the training dataset reflects a more balanced ratio of converting users to non-converting users (e.g., 1:4, 1:5, 2:3, 1:1, etc.). Resampling can include, for example, applying a Synthetic Minority Oversampling Technique (SMOTE).

In some implementations, retraining a machine learning model can include repeating a training process two or more times using a training dataset. Additionally or alternatively, retraining can include training the machine learning model with a different training dataset (e.g., an expanded dataset, an additional training dataset, etc.). In some implementations, a training dataset can be balanced or resampled before retraining the machine learning model.

Figure 4:
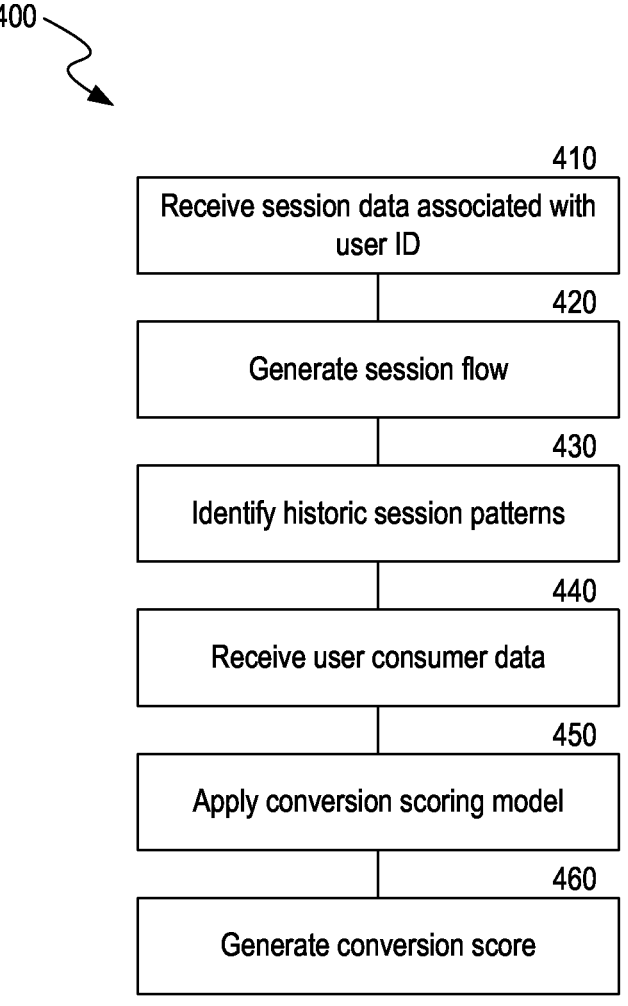
FIG. 4 is a flow diagram illustrating an example process for generating a conversion score to retarget a user of a telecommunications service provider website for content views.

FIG. 4 is a flow diagram illustrating a process 400 for applying a trained machine learning model to generate a conversion score for a user of a telecommunication service provider website. The process 400, or portions thereof, can be performed, for example, by the conversion scoring module 260.

The process 400 begins at block 410, where session data is received for a user who conducts one or more sessions on a website of the telecommunication service provider. The received data can include, for example, records of multiple sessions associated with the same user identifier and information about webpages accessed during each of the sessions, category information for the webpages, time stamps for each session, duration information about each session, and so forth.

The process 400 then proceeds to block 420, where one or more session flows are generated for sessions represented in the session information received at block 410. As described elsewhere herein, a session flow characterizes an individual session associated with the user, including information about an order in which webpages are accessed, a duration of time spent on each webpage, category information about the webpages, and so forth.

The process 400 then proceeds to block 430, where one or more historic session patterns are generated associated with the user. As described elsewhere herein, a historic session pattern can characterize a user's session activity across multiple sessions to show, for example, a frequency of sessions, an average session duration, a count of sessions, and so forth.

The process 400 then proceeds to block 440, where consumer data is received associated with the user identifier. As described elsewhere herein, the consumer data can include personal information of the user, location information associated with the user's location, and/or information about the user's current telecommunication services (e.g., mobile device information, service provider information, etc.).

The process 400 then proceeds to block 450, where the trained machine learning model is applied to the generated session flow(s), generated historic session pattern(s), and received consumer data.

Based on the application of the trained machine learning model, the process 400 generates, at a block 460, a conversion score for the user indicating a likelihood that the user will convert to a customer. The process 400 can also include generating a retargeting recommendation for the user, such as a recommendation to retarget or not to retarget the user, a recommendation about a communication channel via which the user should be retargeted, and/or a recommendation about content with which the user should be retargeted.

In some implementations, the process 400 includes retargeting the user, such as by receiving or creating content with which to retarget the user and causing display of the content to the user via a third-party service (e.g., a website, email or messaging service, or social media platform accessed by the user).

Figure 5:
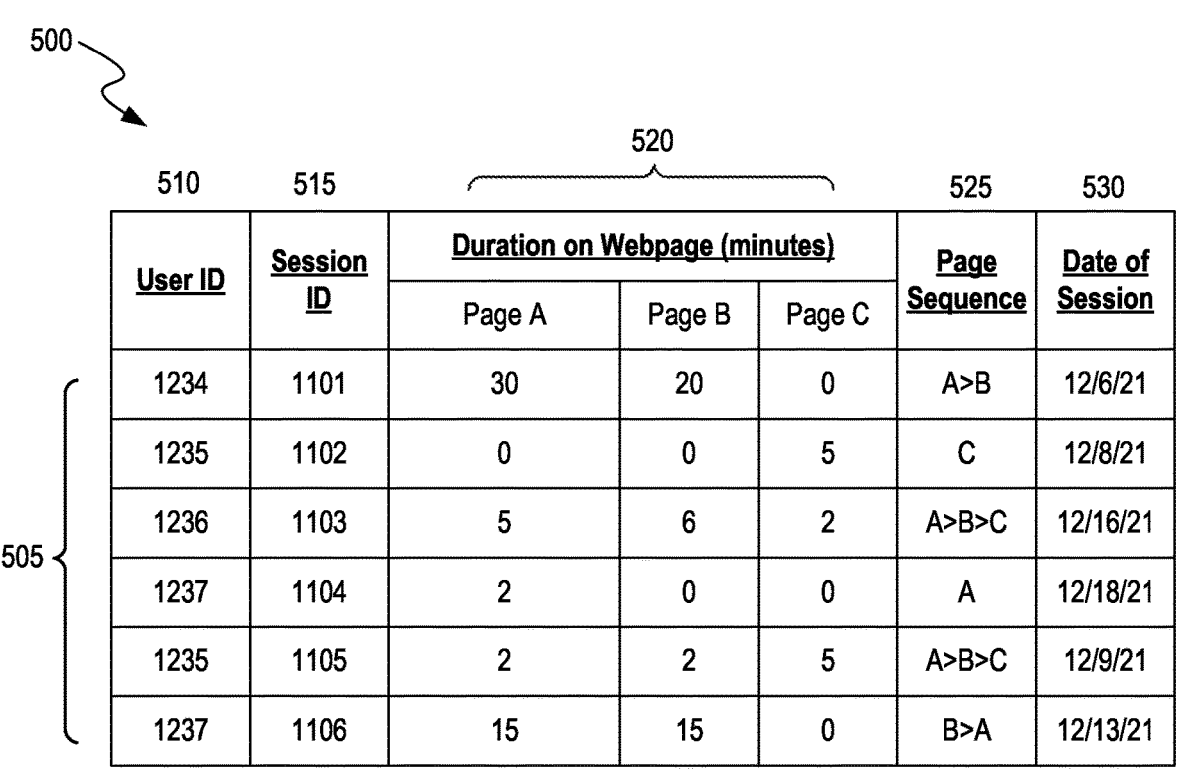
FIG. 5 is a representative table of session data used by a retargeting system to generate session flows and user historic session patterns associated with sessions during which users access a website associated with a telecommunication service provider.

FIG. 5 is a representative table 500 of session data used by a retargeting system to generate session flows and user historic session patterns associated with sessions during which users access a website associated with a telecommunication service provider. The table 500 includes non-limiting examples of session data that might be collected for website sessions in a given two-week period. Each row 505 of table 500 represents a session on the website of the telecommunication service provider. Each column in the table contains data characterizing the session. The user ID column 510 contains a user identifier for a user associated with the session. This can be, for example, an Adobe Experience Cloud Identifier (ECID), or any identifier that can be associated with a user, such as a device identifier of a device associated with the user or an identifier assigned by the telecommunication service provider. Column 515 contains a session identifier assigned to the session. Columns 520 each contain a duration spent during each session on one of three webpages of the website, identified in the table 500 as "Page A," "Page B," and "Page C." These webpages may alternatively be identified by other identifiers, such as a URL or other webpage identifier. Additionally or alternatively, table 500 can include timestamps for start times and end times at which each of the indicated webpages are accessed during the session. Column 525 contains a sequence of webpages—that is, an order in which each of the webpages indicated in columns 520 are accessed. Column 530 includes a date of the session.

Using the session data in the table 500, the retargeting system can generate session flows for each session, including an identifier for the session, an order in which webpages are accessed during the session, and duration information about the session and time spent on each webpage during the session. The session flow also indicates a user identifier associated with the session and whether the user identifier is associated with a converting or non-converting user.

In addition, the session data in the table 500 can be used to generate historic session patterns for each user. For example, a historic session pattern would include a number of sessions associated with each user, a frequency of sessions during an analyzed time period, and duration information about the sessions associated with the user (e.g., an average duration). For example, historic session patterns would show that users 1234 and 1236 only conducted one session on the website in the given two-week period (i.e., a session frequency of 1 session per 14 days), whereas users 1235 and 1237 each conducted two sessions (i.e., a session frequency of 2 sessions per 14 days).

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computer-implemented method to retarget users of a telecommunication service provider website, the method comprising:

receiving session data corresponding to multiple sessions associated with the users visiting one or more websites of a telecommunication service provider, each session of the multiple sessions defining a user accessing and interacting with a set of multiple webpages of the one or more websites of the telecommunication service provider, and the received session data specifying, for each session of the multiple sessions: (1) a user identifier, (2) a session identifier, (3) a duration of time spent by the user on each webpage in the set of multiple webpages, (4) a set of user actions detected of the user interacting with the multiple webpages, (5) an indication of whether the user converted to a subscriber of the telecommunication service provider during or after a corresponding session, and (6) at least one content associated with the telecommunication service provider that is displayed to the user before the user converted;

generating session flows for each of the multiple sessions corresponding to the session data, each session flow of the session flows including stored information indicating a sequence of webpages in the set of multiple webpages that the user accessed while interacting with the set of multiple webpages, and the stored information for each webpage in the sequence of webpages indicating the duration of time and the set of user actions;

generating a historic session pattern associated with each user identifier specified in the received session data;

receiving consumer information associated with each user identifier specified in the received session data, the received consumer information comprising a locked status indicating whether a device associated with the user identifier specified in the received session data is restricted to a specific provider of telecommunications services;

creating a training dataset that includes: (1) each session flow of the generated session flows, (2) each generated historic session pattern associated with each user identifier specified in the received session data, (3) the received consumer information associated with each user identifier specified in the received session data, and (4) information designating each session flow of the session flows as being associated with either a converting user or a non-converting user;

training, using the training dataset, a machine learning model to use a combined input including: (1) an input session flow of a non-subscriber user interacting with a plurality of webpages of the one or more websites of the telecommunication service provider, (2) an input historic session pattern associated with the non-subscriber user, and (3) an input consumer information associated with the non-subscriber user, the input consumer information indicating that the non-subscriber user is a customer of another service provider differing from the telecommunication service provider;

generating, by the trained machine learning model processing the combined input, a conversion score indicating a likelihood that the non-subscriber user will convert to a subscriber of the telecommunication service provider based on the input session flow, the input historic session pattern, and the input consumer information associated with the non-subscriber user;

retargeting the non-subscriber user via a first communication channel of a third-party service accessed by the non-subscriber user as a result of the conversion score exceeding a first threshold score, the non-subscriber user being retargeted to view the at least one content associated with the telecommunication service provider by:

causing display, at a user interface of the non-subscriber user, the at least one content associated with the telecommunications service provider via the first communication channel, the third-party service being different from services provided by the telecommunication service provider;

retargeting the non-subscriber user via a second communication channel of the third-party service accessed by the non-subscriber user when the conversion score exceeds a second threshold score different from the first threshold score, the second communication channel being different and separate from the first communication channel, and the non-subscriber user being retargeted to view the at least one content associated with the telecommunication service provider by:

causing display, at the user interface of the non-subscriber user, the at least one content associated with the telecommunications service provider via the second communication channel of the third-party service;

evaluating the trained machine learning model using a testing dataset, the testing dataset including session flows, historic session patterns, and consumer information of known converting and non-converting users;

assessing accuracy of the trained machine learning model based on the evaluating and the retargeting of the non-subscriber user via the first communication channel or the second communication channel; and when the accuracy of the trained machine learning model does not exceed a threshold accuracy, retraining the trained machine learning model based on the retargeting of the non-subscriber user.

2. The computer-implemented method of claim 1, wherein the third-party service is one of a third-party website, a social media platform, or an email or messaging service accessed by the non-subscriber user.

3. The computer-implemented method of claim 1, wherein the received consumer information includes one or more of a location identifier of a location associated with a user represented in the session data, income information associated with the location of the user represented in the session data, demographic information associated with the location of the user represented in the session data, personal information associated with the user represented in the session data, device information of a device associated with the user represented in the session data, or information about a current telecommunication service of the user represented in the session data.

4. The computer-implemented method of claim 1, wherein the received session data includes webpage category information associated with at least one webpage of the one or more websites of the telecommunication service provider.

5. The computer-implemented method of claim 1, wherein the generated historic session pattern includes, for user session activity across multiple sessions within an analyzed time period, at least one of a session frequency, a session count, an average number of webpages accessed per session, or session duration information.

6. The computer-implemented method of claim 1, wherein the retraining the trained machine learning model includes at least one of:

training the trained machine learning model at least a second time using the training dataset, resampling at least a portion of the training dataset, or training the trained machine learning model using a different training dataset.

7. The computer-implemented method of claim 1 further comprising:

generating, based on the conversion score indicating the likelihood that the non-subscriber user will convert to a subscriber of the telecommunication service provider, a retargeting recommendation for the non-subscribing user, the retargeting recommendation indicating whether to retarget or not to retarget the non-subscriber user, a communication channel via which the non-subscriber user should be retargeted, a content with which the non-subscriber user should be retargeted, or a combination thereof.

8. At least one computer-readable medium, excluding transitory signals, carrying instructions that, when executed by at least one processor, cause the at least one processor to perform operations comprising:

receive session data corresponding to multiple sessions associated with users visiting one or more websites of a telecommunication service provider, each session of the multiple sessions defining a user accessing and interacting with a set of multiple webpages of the one or more websites of the telecommunication service provider, and the received session data specifying, for each session of the multiple sessions: (1) a user identifier, (2) a session identifier, (3) a duration of time spent by the user on each webpage in the set of multiple webpages, (4) a set of user actions detected of the user interacting with the multiple webpages, (5) an indication of whether the user converted to a subscriber of the telecommunication service provider during or after a corresponding session, and (6) at least one content associated with the telecommunication service provider that is displayed to the user before the user converted;

generate session flows for each of the multiple sessions corresponding to the session data, each session flow of the session flows including stored information indicating a sequence of webpages in the set of multiple webpages that the user accessed while interacting with the set of multiple webpages, and the stored information for each webpage in the sequence of webpages indicating the duration of time and the set of user actions;

generate a historic session pattern associated with each user identifier specified in the received session data;

receive consumer information associated with each user identifier specified in the received session data, the received consumer information comprising a locked status indicating whether a device associated with the user identifier specified in the received session data is restricted to a specific provider of telecommunications services;

create a training dataset that includes: (1) each session flow of the generated session flows, (2) each generated historic session pattern associated with each user identifier specified in the received session data, (3) the received consumer information associated with each user identifier specified in the received session data, and (4) information designating each session flow of the session flows as being associated with either a converting user or a non-converting user;

train, using the training dataset, a machine learning model to use a combined input including: (1) an input session flow of a non-subscriber user interacting with a plurality of webpages of the one or more websites of the telecommunication service provider, (2) an input historic session pattern associated with the non-subscriber user, and (3) an input consumer information associated with the non-subscriber user, the input consumer information indicating that the non-subscriber user is a customer of another service provider differing from the telecommunication service provider;

generate, by the trained machine learning model processing the combined input, a conversion score indicating a likelihood that the non-subscriber user will convert to a subscriber of the telecommunication service provider based on the input session flow, the input historic session pattern, and the input consumer information associated with the non-subscriber user;

retarget the non-subscriber user via a first communication channel of a third-party service accessed by the non-subscriber user as a result of the conversion score exceeding a first threshold score, the non-subscriber user being retargeted to view the at least one content associated with the telecommunication service provider by:

causing display, at a user interface of the non-subscriber user, the at least one content associated with the telecommunications service provider via the first communication channel, the third-party service being different from services provided by the telecommunication service provider;

retarget the non-subscriber user via a second communication channel of the third-party service accessed by the non-subscriber user when the conversion score exceeds a second threshold score different from the first threshold score, the second communication channel being different and separate from the first communication channel, and the non-subscriber user being retargeted to view the at least one content associated with the telecommunication service provider by:

causing display, at the user interface of the non-subscriber user, the at least one content associated with the telecommunications service provider via the second communication channel of the third-party service;

evaluate the trained machine learning model using a testing dataset, the testing dataset including session flows, historic session patterns, and consumer information of known converting and non-converting users;

assess accuracy of the trained machine learning model based on the evaluating and the retargeting of the non-subscriber user via the first communication channel or the second communication channel; and when the accuracy of the trained machine learning model does not exceed a threshold accuracy, retrain the trained machine learning model based on the retargeting of the non-subscriber user.

9. The at least one computer-readable medium of claim 8, wherein the third-party service is one of a third-party website, a social media platform, or an email or messaging service accessed by the non-subscriber user.

10. The at least one computer-readable medium of claim 8, wherein the received consumer information includes one or more of a location identifier of a location associated with a user represented in the session data, income information associated with the location of the user represented in the session data, demographic information associated with the location of the user represented in the session data, personal information associated with the user represented in the session data, device information of a device associated with the user represented in the session data, or information about a current telecommunication service of the user represented in the session data.

11. The at least one computer-readable medium of claim 8, wherein the received session data includes webpage category information associated with at least one webpage of the one or more websites of the telecommunication service provider.

12. The at least one computer-readable medium of claim 8, wherein the generated historic session pattern includes, for user session activity across multiple sessions within an analyzed time period, at least one of a session frequency, a session count, an average number of webpages accessed per session, or session duration information.

13. The at least one computer-readable medium of claim 8, wherein the retraining the trained machine learning model further causes the at least one processor to perform operations comprising at least one of:

train the trained machine learning model at least a second time using the training dataset, resample at least a portion of the training dataset, or train the trained machine learning model using a different training dataset.

14. The at least one computer-readable medium of claim 8, wherein the instructions further cause the at least one processor to:

generate, based on the conversion score indicating the likelihood that the non-subscriber user will convert to a subscriber of the telecommunication service provider, a retargeting recommendation for the non-subscribing user, the retargeting recommendation indicating whether to retarget or not to retarget the non-subscriber user a communication channel via which the non-subscriber user should be retargeted a content with which the non-subscriber user should be retargeted, or a combination thereof.

15. A computing system comprising:
at least one hardware processor; and at least one memory, excluding transitory signals, carrying instructions that, when executed by the at least one hardware processor, cause the computing system to perform operations comprising:

receive session data corresponding to multiple sessions associated with users visiting one or more websites of a telecommunication service provider, each session of the multiple sessions defining a user accessing and interacting with a set of webpages of the one or more websites of the telecommunication service provider, and the received session data specifying, for each session of the multiple sessions: (1) a user identifier, (2) a session identifier, (3) a duration of time spent by the user on each webpage in the set of multiple webpages, (4) a set of user actions detected of the user interacting with the multiple webpages, (5) an indication of whether the user converted to a subscriber of the telecommunication service provider, and (6) at least one content associated with the telecommunication service provider that is displayed to the user before the user converted;

generate session flows for each of the multiple sessions corresponding to the session data, each session flow of the session flows including stored information indicating a sequence of webpages in the set of multiple webpages that the user accessed while interacting with the set of multiple webpages, and the stored information for each webpage in the sequence of webpages indicating the duration of time and the set of user actions;

generate a historic session pattern associated with each user identifier specified in the received session data;

receive consumer information associated with each user identifier specified in the received session data, the received consumer information comprising a locked status indicating whether a device associated with the user identifier specified in the received session data is restricted to a specific provider of telecommunications services;

create a training dataset that includes: (1) each session flow of the generated session flows, (2) each generated historic session pattern associated with each user identifier specified in the received session data, (3) the received consumer information associated with each user identifier specified in the received session data, and (4) information designating each session flow of the session flows as being associated with either a converting user or a non-converting user;

train, using the training dataset, a machine learning model to use a combined input including: (1) an input session flow of a non-subscriber user interacting with a plurality of webpages of the one or more websites of the telecommunication service provider, (2) an input historic session pattern associated with the non-subscriber user, and (3) an input consumer information associated with the non-subscriber user, the input consumer information indicating that the non-subscriber user is a customer of another service provider differing from the telecommunication service provider;

generate, by the trained machine learning model processing the combined input, a conversion score indicating a likelihood that the non-subscriber user will convert to a subscriber of the telecommunication service provider based on the input session flow, the input historic session pattern, and the input consumer information associated with the non-subscriber user;

retarget the non-subscriber user via a first communication channel of a third-party service accessed by the non-subscriber user as a result of the conversion score exceeding a first threshold score, the non-subscriber user being retargeted to view the at least one content associated with the telecommunication service provider by:

causing display, at a user interface of the non-subscriber user, the at least one content associated with the telecommunications service provider via the first communication channel, the third-party service being different from services provided by the telecommunication service provider;

retarget the non-subscriber user via a second communication channel of the third-party service accessed by the non-subscriber user when the conversion score exceeds a second threshold score different from the first threshold score, the second communication channel being different and separate from the first communication channel, and the non-subscriber user being retargeted to view the at least one content associated with the telecommunication service provider by:

causing display, at the user interface of the non-subscriber user, the at least one content associated with the telecommunications service provider via the second communication channel of the third-party service;

evaluate the trained machine learning model using a testing dataset, the testing dataset including session flows, historic session patterns, and consumer information of known converting and non-converting users;

assess accuracy of the trained machine learning model based on the evaluating and the retargeting of the non-subscriber user via the first communication channel or the second communication channel; and when the accuracy of the trained machine learning model does not exceed a threshold accuracy, retrain the trained machine learning model based on the retargeting of the non-subscriber user.

16. The computing system of claim 15, wherein the third-party service is one of a third-party website, a social media platform, or an email or messaging service accessed by the non-subscriber user.

17. The computing system of claim 15, wherein the received consumer information includes one or more of a location identifier of a location associated with a user represented in the session data, income information associated with the location of the user represented in the session data, demographic information associated with the location of the user represented in the session data, personal information associated with the user represented in the session data, device information of a device associated with the user represented in the session data, or information about a current telecommunication service of the user represented in the session data.

18. The computing system of claim 15, wherein the received session data includes webpage category information associated with at least one webpage of the one or more websites of the telecommunication service provider.

19. The computing system of claim 15, wherein the retraining the trained machine learning model further causes the computing system to perform operations comprising at least one of:

train the trained machine learning model at least a second time using the training dataset, resample at least a portion of the training dataset, or train the trained machine learning model using a different training dataset.

20. The computing system of claim 15 further caused to:

generate, based on the conversion score indicating the likelihood that the non-subscriber user will convert to a subscriber of the telecommunication service provider, a retargeting recommendation for the non-subscribing user, the retargeting recommendation indicating whether to retarget or not to retarget the non-subscriber user, a communication channel via which the non-subscriber user should be retargeted, a content with which the non-subscriber user should be retargeted, or a combination thereof.

* * * * *